UNITED STATES PATENT OFFICE.

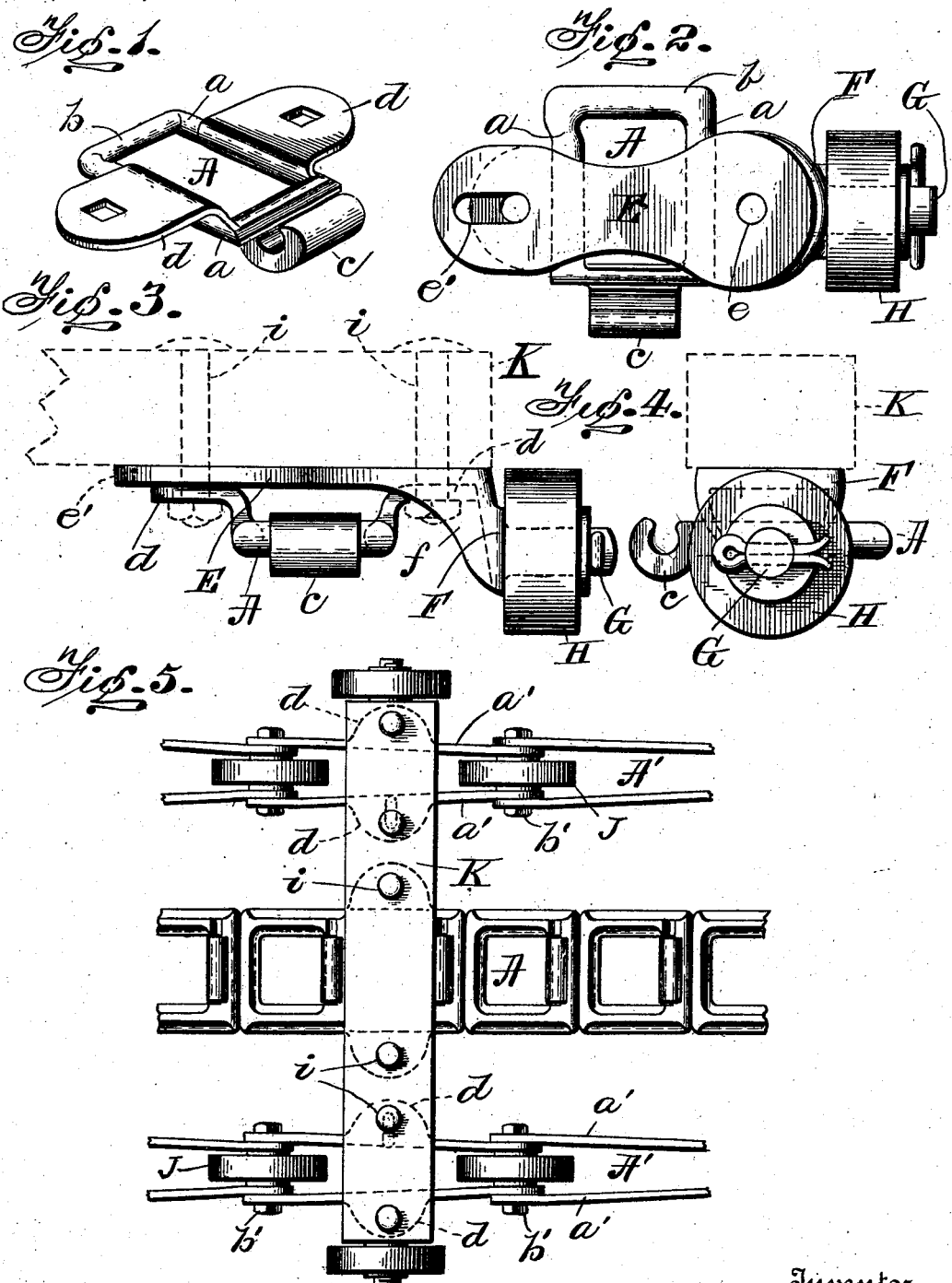

CHRISTOPHER W. LEVALLEY, OF MILWAUKEE, WISCONSIN.

CHAIN CONVEYER.

SPECIFICATION forming part of Letters Patent No. 700,342, dated May 20, 1902.

Original application filed November 18, 1898, Serial No. 696,933. Divided and this application filed September 27, 1900. Serial No. 31,306. (No model.)

*To all whom it may concern:*

Be it known that I, CHRISTOPHER W. LE-VALLEY, a citizen of the United States, residing at Milwaukee, in the county of Milwaukee and State of Wisconsin, have invented new and useful Improvements in Chain-Conveyers, of which the following is a specification.

My invention has for its object to produce a chain conveyer which is adapted to a wide variety of uses in the way of driving and carrying; and the invention consists in improvements in such conveyers whereby they are provided with supporting rollers or wheels which are adapted to run upon tracks or ways and in improvements in a construction of the conveyer as a whole or organized apparatus.

In the accompanying drawings, which I have used to illustrate the principle of my invention and one embodiment thereof, Figure 1 is a perspective view of a common form of chain-link, to which in the other views I have shown my invention as being applied. Fig. 2 is a top plan view of such a link, to which is secured the carrier or support for a wheel or roller. Fig. 3 is a side view of the parts shown in Fig. 2, in this view there being indicated in dotted line a cross slat or bar of the conveyer. Fig. 4 is an end view of the parts shown in Fig. 2. Fig. 5 is a top plan view of a section of a conveyer embodying my improvements and comprising three parallel lines of chain.

In the drawings, A represents the link of a drive-chain. It has side bars $a\ a$, an end bar $b$, and a coupling-hook $c$, the end bars and coupling-hooks of adjacent links when properly united constituting the articulating parts of the links. The side bars of the chain-link are provided with laterally-extending wings $d$, which are perforated for the passage of bolts or rivets or other attaching devices. The several parts of the link thus far described are integral; but as my invention is applied to other forms of chain I have in Fig. 5 represented a form of chain A', having independent side bars $a'\ a'$, which are united by suitable cross-bolts or pins $b'$, arranged at the joints or articulating parts of the chain. As this is a common form of link, it need not be further described. The side bars of certain of the links A' are formed with wings $d$, which are similar to the wings $d$ of the links A.

It is frequently desirable to provide conveyers with supporting rollers or wheels arranged to one side of the line of chain, and a part of my invention consists of carriers or supports for such wheels which are adapted to be applied to the links of the chain or to certain of them.

Referring particularly to Figs. 2, 3, and 4, E represents a plate adapted to rest upon and be secured to the wings $d$ of a chain-link. The plate is provided with an aperture $e$ near one side and near its opposite end with a slot $e'$, and it is secured to the chain by bolts, rivets, or pins $i$, which pass through the hole and slot in the plate just referred to and the holes in the wings of the chain, with which these openings register. By elongating one of the openings $e'$, thus forming it into a slot, the attaching-plate is adapted to be used in connection with links of a considerable difference in size. From one end of the plate there extends a depending bracket F, provided at its end with a short axle or trunnion G, upon which is mounted an antifriction wheel or roller H. The bracket F is provided at its edges with side flanges $f$, which extend sufficiently far along the edges of the plate E to constitute bearings which engage with the side edges of the wing $d$ of the link to which the carrier is secured. This construction tends to prevent the carrier from working loose or twisting upon the link.

As will be seen by reference to Figs. 1, 3, and 4, the wings $d$ are raised somewhat above the plane of the side bars, so that when the plate E is secured to the wings it is supported sufficiently far above the link to permit the sprocket-teeth of the driving-wheel to pass through the opening in the link and properly engage with the link without coming in contact with the plate.

The bracket F preferably depends, so that the axis of the wheel H is substantially in or slightly below a horizontal plane cutting the axes of the joints or articulating parts of the chain; but this, while the preferred construction, may be varied without departing from the principle of the invention.

It will be seen that not only is the carrier adapted to be applied to various kinds of links and links of various sizes, but that it may be applied so as to bring the roller upon either the right or left hand side of the chain, as may be desired, being thus reversible, which is a very desirable feature, as but one form of carrier is thus required. It will also be evident that the carrier could be provided at each end with a bracket and stub-axle for a roller; but this is usually not necessary or desirable.

The invention which I have thus far described is applicable to a single line of chain when being used alone, as is the practice with many forms of conveyers. The links of the chain of such a conveyer would be provided with attachments, either integral therewith or applied thereto to suit the particular style of conveying or carrying for which the conveyer is being used.

It will be observed that by the use of the attachments such as I have described it is not only possible to arrange the supporting or antifriction wheels H outside of the line of the chain, but that it is also possible to employ wheels of any desired width of tread, instead of being limited to such width as will go between the side bars, as when antifriction-wheels of the character indicated at J in Fig. 5 are depended upon. Another advantage over the arrangement last referred to— that is, where the antifriction-wheels are arranged between the side bars—is that the wear of the bearing or supporting wheels is not at all upon the articulating parts of the chain, with the result that the chain wears longer and retains its pitch more perfectly than where the antifriction bearing or supporting wheels are mounted upon the articulating parts of the chain. By attaching the supports for the wheels directly to the side bars of the links and arranging them intermediate of or between the joints or articulating parts of the chain the bearing-supports for the conveyer are applied at their most advantageous points.

It will be understood that suitable tracks or ways are provided upon which the wheels or collars travel.

It is sometimes desirable to construct a conveyer with several parallel lines of chain, as when the conveyer is very wide and it is desirable that its cross slats or pieces should be supported at more points than can well be provided when using a single line of chain, and I have in Fig. 5 represented a conveyer of this type to which my invention is applied. With conveyers of this kind a single line of chain is often sufficient to apply the necessary power for driving the conveyer, the other lines of chain being used particularly to steady and properly support the cross-pieces of the conveyer near their outer ends. In Fig. 5 the central line of chain is made up of links A, and this is the driving-chain, while the outer lines of chain are made up of links A', which may be relatively light and are employed only to steady and support the cross-pieces of the conveyer.

K represents a cross-slat arranged transversely to the lines of chain and secured thereto by bolts and rivets $i$, passing through the cross-slat and the wings $d$ of the chain.

Figs. 3 and 5 illustrate how the carrier E F G for a supporting-wheel H may be secured to the same links that the cross-piece K is secured to. This is a desirable engagement, as it brings the supporting wheels or rollers H directly in line with the cross-pieces K.

This case is a division of my application for Letters Patent filed November 18, 1898, Serial No. 696,933.

Having described my invention, what I claim, and desire to secure by Letters Patent, is—

1. In a conveyer, the combination with a chain formed of articulating links having side bars, of antifriction-wheels attached to the side bars of the chain intermediate of the joints or articulating parts thereof, substantially as set forth.

2. In a conveyer, the combination with a chain formed of articulated links having side bars, the side bars of certain of the links being provided, between their ends, with supporting-wings, of antifriction-wheels, and wheel-carriers therefor supported by the said wings of the chain-links, substantially as set forth.

3. In a conveyer, the combination with a chain formed of articulated links, of antifriction supporting-wheels for the chain connected directly with the links thereof and arranged laterally outside of or beyond the sides of the chain, substantially as set forth.

4. In a conveyer, the combination with a chain composed of articulated links having side bars, of antifriction-wheels adapted to support the chain, the said wheels being attached to the side bars intermediate of the articulating parts of the chain and being arranged outside of or beyond the side edges of the chain, substantially as set forth.

5. In a conveyer, the combination with a chain formed of articulated links, certain of which are provided with wings which are arranged in a plane above that of the links, of antifriction-wheels and wheel-carriers therefor supported upon said wings and extending across the links, whereby the wheel-carriers are supported in such position as not to interfere with the teeth of the driving or sprocket wheels, substantially as set forth.

6. In a conveyer, the combination with a chain formed of articulated links having side bars, certain of which are provided with wings which are arranged in a plane above that of the links, of antifriction-wheels for supporting the chain and carriers for the said wheels secured to the said wings, the said carriers being formed with depending bracket-arms carrying axles for the wheels, substantially as set forth.

7. In a conveyer, the combination with a chain-link having wings, a supporting-wheel, and a carrier for the wheel, having an attaching-plate adapted to be secured to the said wings, the said plate being formed with a hole $e$ and a slot $e'$ for the passage of the attaching means, whereby the carrier is adapted for use with links of different sizes, substantially as set forth.

8. In a conveyer, the combination with a chain-link formed with wings, of an antifriction supporting-wheel, and a carrier for the wheel having a plate adapted to rest upon and be secured to the said wings, the carrier being provided with a bracket and axle for the wheel, and also with flanges which engage with the opposite sides of one of the wings, substantially as set forth.

9. In a conveyer, the combination with a chain-link having opposite side bars formed with wings, a carrier-wheel arranged to one side of the chain-link, and a support or carrier for the wheel secured to the wings of both of the side bars of the link, whereby the wheel is supported from both sides of the chain, substantially as set forth.

10. In a conveyer, the combination with a chain formed of articulated links, certain of which are formed with wings, of antifriction supporting or bearing wheels for the chain adapted to lie outside of the edge of the chain, reversible carriers for the wheels adapted to rest upon and be supported by the wings of the chain-links, and means for securing the said wheel-carriers to the wings of the chain-links, substantially as set forth.

11. In a conveyer, the combination of a plurality of parallel lines of chain formed of articulated links, cross-pieces connecting the lines of chain, and rollers or wheels arranged in the transverse planes of the said connecting cross-pieces, and outside of the edges of the lines of chain, substantially as set forth.

12. In a conveyer, the combination of a plurality of lines of chains formed of articulated links having side bars, certain of the side bars of the links being provided with wings, cross-pieces connecting the lines of chain and supported upon the said wings, supporting-wheels for the chains and carriers for the wheels also supported by the said wings, substantially as set forth.

13. A conveyer comprising a line of drive-chain, and parallel lines of supporting-chains and cross-pieces secured to the said lines of chain, substantially as set forth.

14. A conveyer, comprising a line of drive-chain, lines of supporting-chains parallel thereto, cross-pieces uniting the said lines of chains, and supporting-wheels carried by the chain in line with the cross-pieces and intermediate the joints or articulating parts of the chains, substantially as set forth.

CHRISTOPHER W. LEVALLEY.

Witnesses:
WM. C. FRYE,
V. I. KLOFANDA.